United States Patent
Oroskar et al.

(10) Patent No.: US 10,355,751 B1
(45) Date of Patent: Jul. 16, 2019

(54) METHODS AND SYSTEMS FOR SELECTING A COORDINATED MULTIPOINT ENHANCEMENT MODE

(71) Applicant: Sprint Spectrum L.P., Overland Park, KS (US)

(72) Inventors: Siddharth S. Oroskar, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 184 days.

(21) Appl. No.: 15/458,784

(22) Filed: Mar. 14, 2017

(51) Int. Cl.
*H04W 4/00* (2018.01)
*H04B 7/024* (2017.01)
*H04W 72/12* (2009.01)
*H04W 52/02* (2009.01)
*H04W 72/08* (2009.01)

(52) U.S. Cl.
CPC ........ *H04B 7/024* (2013.01); *H04W 52/0212* (2013.01); *H04W 72/08* (2013.01); *H04W 72/1278* (2013.01)

(58) Field of Classification Search
CPC .. H04B 7/024; H04W 52/0212; H04W 72/08; H04W 72/1278
See application file for complete search history.

(56) References Cited

U.S. PATENT DOCUMENTS

| 8,958,345 | B2 | 2/2015 | Rath et al. | |
|---|---|---|---|---|
| 8,989,125 | B1 | 3/2015 | Marupaduga et al. | |
| 9,143,972 | B2 | 9/2015 | Tao et al. | |
| 2012/0184322 | A1* | 7/2012 | Falconetti | H04W 28/18 455/524 |
| 2013/0040675 | A1 | 2/2013 | Ant et al. | |
| 2013/0258884 | A1 | 10/2013 | Xu et al. | |
| 2014/0016582 | A1* | 1/2014 | Prakash | H04W 72/0406 370/329 |
| 2014/0293889 | A1* | 10/2014 | Mahr | H04L 1/1825 370/329 |
| 2014/0348011 | A1* | 11/2014 | Zirwas | H04L 1/0025 370/252 |
| 2015/0049626 | A1 | 2/2015 | Chen et al. | |

(Continued)

OTHER PUBLICATIONS

3GPP, "3rd Generation Partnership Project; Technical Specification Group Radio Access Network; Public safety broadband high power User Equipment (UE) for band 14", Dec. 2012, 48 pages, vol. 11, France.

(Continued)

*Primary Examiner* — Stephen M D Agosta

(57) ABSTRACT

Methods and systems are disclosed that can help to select an enhancement mode for uplink coordinated multipoint (CoMP). An exemplary method involves: 9a) determining, from a plurality of possible communication types, a communication type of a communication associated with a first user equipment (UE), wherein the first UE is capable of uplink CoMP communication via an access network; (b) based at least in part on the determined communication type, selecting either a battery-saving mode or a throughput-enhancement mode as an uplink CoMP enhancement mode for the first UE; and (c) providing uplink CoMP service to the first UE according to the selected mode.

19 Claims, 6 Drawing Sheets

(56) References Cited

U.S. PATENT DOCUMENTS

2015/0092893 A1\* 4/2015 Tabet ................. H04L 27/2649
　　　　　　　　　　　　　　　　　　　　　375/340
2015/0341149 A1　11/2015 Chatterjee et al.
2016/0242174 A1\* 8/2016 Bontu ................. H04W 72/005

OTHER PUBLICATIONS

Hsu et al., "Dynamic Cooperating Set Planning for Coordinated Multi-Point (CoMP) in LTE/LTE-Advanced Systems", Dec. 2, 2013, IEEE.

\* cited by examiner

METHODS AND SYSTEMS FOR SELECTING A COORDINATED MULTIPOINT ENHANCEMENT MODE

BACKGROUND

In a wireless communication system, a base station may provide one or more coverage areas, such as cells or sectors, in which the base station may serve user equipment devices (UEs), such as cell phones, wirelessly-equipped personal computers or tablets, tracking devices, embedded wireless communication modules, or other devices equipped with wireless communication functionality (whether or not operated by a human user).

In general, each coverage area may operate on one or more carriers each defining one or more ranges of frequency spectrum and having a respective "downlink channel" for carrying communications from the base station to UEs and a respective "uplink channel" for carrying communications from the UEs to the base station. Such carriers may be frequency division duplex (FDD), in which the downlink and uplink channels are defined as separate respective ranges of frequency, or time division duplex (TDD), in which the downlink and uplink channels are defined on a common range of frequency but distinguished through time division multiplexing. Further, the downlink channel and uplink channel of each carrier may also be divided into respective sub-channels for carrying particular communications, such as one or more control channels for carrying control signaling and one or more traffic channels for carrying application-layer data and other traffic.

For instance, in a system operating according to an orthogonal frequency division multiple access (OFDMA) protocol, such as the Long Term Evolution (LTE) standard of the Universal Mobile Telecommunications System (UMTS) for example, the air interface is divided over time into frames and sub-frames each defining two slots, and the uplink and downlink channels are each divided over their frequency bandwidth into sub-carriers that are grouped within each slot into resource blocks. When a UE is positioned within coverage of a base station in such a system, the UE may register or "attach" with the base station on a particular carrier on which the base station is configured to provide, and the base station may then schedule particular downlink and uplink resource blocks on that carrier to carry data communications to and from the UE. Further, the base station and UE may modulate their air interface data communications at a coding rate selected based on quality of the UE's coverage, such as with higher rate coding rate when the UE is in better coverage of the base station and with a lower coding rate when the UE is in worse coverage of the base station.

In OFDMA networks, such as LTE networks, reception at cell edges may be problematic for various reasons. For example, the greater distance to a base station at a cell edge may result in lower signal strength. Further, at a cell edge, interference levels from neighboring cells are likely to be higher, as the wireless communication device is generally closer to neighboring cells when at a cell edge.

In an effort to improve the quality of service at cell edges, 3GPP LTE-A Release 11 introduced a number of Coordinated Multipoint (CoMP) schemes. By implementing such CoMP schemes, a cooperating set of cells may improve service at cell edges by coordinating transmission and/or reception in an effort to avoid inter-cell interference, and in some cases, to convert inter-cell interference into a usable signal that actually improves the quality of service that is provided.

LTE-A Release 11 defined a number of different CoMP schemes or modes for both the uplink (UL) and the downlink (DL). For the downlink, two basic types of CoMP modes are set forth: joint processing (JP) schemes and coordinated scheduling/beamforming (CSCH or DL-CSCH) schemes. For the uplink, numerous types of CoMP modes have been devised.

Some uplink CoMP modes may involve "joint reception" and/or "joint processing." Joint reception generally involves multiple cells receiving an uplink signal that is transmitted by a given UE. Uplink CoMP modes may involve interference rejection combining (IRC) or coordinated scheduling for purposes of reducing or preventing interference between transmissions from different user devices. When cells in a cooperating set are served by different base stations (e.g., inter-eNodeB CoMP), joint processing can involve the multiple base stations that received the uplink signal from the UE, sending the respectively received signals or a decoded and/or processed version of the respectively received signals to one another, or just to a base station of the serving cell in the group. In both intra- and inter-eNodeB CoMP, combination of the multiple received versions of a UE's transmissions on physical uplink shared channel (PUSCH) in multiple cells can provide uplink gain.

OVERVIEW

In some CoMP implementations, network settings may be used to adjust the way in which benefits of CoMP are realized. In particular, different enhancement modes may be used to effect the way in which the uplink gain provided by joint reception on the physical uplink shared channel (PUSCH) are utilized. As an example, an eNodeB may adjust an enhancement-mode setting so as to switch between a battery-saving mode and a throughput-enhancement mode. In the battery-saving mode, the gain provided by uplink CoMP (e.g., by joint reception) is utilized to allow a UE to reduce its transmission power, which can potentially reduce the amount of power the UE utilizes for a given transmission. When the throughput-enhancement mode is selected, the gain provided by uplink CoMP is utilized to enhance the uplink throughput of the UE.

While the uplink CoMP throughput-enhancement mode can improve uplink throughput, the inventors have recognized that there are certain types of communications and/or applications that do not typically benefit from increasing throughput on the uplink beyond some threshold level, Examples include communications for which the quality of service (QoS) is typically latency dependent and/or dependent upon the block error rate (BLER), such as a Voice-over-LTE (VoLTE) call or another type of Voice-over-IP (VoIP) call, among other possibilities. Further, the nature of user interaction during some types of communications and/ or some types of application sessions is such that the majority of data transfer happens on the downlink and/or is such that there is typically very little uplink activity. Examples may include, but are not limited to, audio and/or video streaming (where a user watches audio and/or video streaming on the downlink), and browsing on a social network webpage or application (where there is typically little to no uplink communication, aside from brief periods when the user uploads their own photos or videos), among other possibilities. Accordingly, example embodiments may allow for an eNodeB to dynamically select or switch to the battery saving mode for uplink CoMP when a UE is engaged in such communications where additional uplink throughput is not expected to improve QoS.

In a further aspect of example embodiments, an eNodeB can dynamically select and utilize the uplink CoMP throughput enhancement mode when a UE is engaged in, requests, and/or initiates a communication of a type expected to benefit from additional uplink throughput. For example, if a UE is engaged in a file upload, such as an upload using file transfer protocol (FTP), or a video upload to a video sharing service or social network, an eNodeB may responsively use the throughput enhancement mode to provide uplink CoMP service to the UE. As another example, when a UE is communicating via a bearer that does not provide a guaranteed bit rate (GBR), this may be interpreted as an indication that the communication might benefit from increased uplink throughput. As such, when an eNodeB operating in accordance with an exemplary embodiment determines that a UE's communication is assigned to a non-GBR bearer, the eNodeB may responsively utilize the throughput enhancement mode to provide uplink CoMP service to the UE (or might evaluate other factors to determine whether the throughput enhancement mode is likely to be beneficial).

More generally, in one aspect, an exemplary method involves: (a) determining, from a plurality of possible communication types, a communication type of a communication associated with a first UE, wherein the first UE is capable of uplink CoMP communication via an access network; (b) based at least in part on the determined communication type, selecting either a battery-saving mode or a throughput-enhancement mode as an uplink CoMP enhancement mode for the first UE; and (c) providing uplink CoMP service to the first UE according to the selected mode.

Another exemplary involves an eNodeB initially determining a data-usage class that is associated with a first UE, wherein the data-usage class is one of a plurality of predefined data-usage classes comprising at least a first and a second data-usage class. When the first data-usage class is not associated with the first UE and the first UE is capable of uplink CoMP, the eNodeB (a) determines, from a plurality of possible communication types, a communication type of a communication associated with the first UE; (b) based at least in part on the determined communication type, selects either a battery-saving mode or a throughput-enhancement mode as an uplink CoMP enhancement mode for the first UE; and (c) provides uplink CoMP service to the first UE according to the selected mode. And, when the first data-usage class is associated with the first UE or the first UE is not capable of uplink CoMP communication, or both, the eNodeB refrains from providing uplink CoMP service to the first UE.

In another aspect, an exemplary system can be implemented in a network component such as an eNodeB, and includes a communication interface operable for cellular communications with UE, at least one processor, and program instructions stored in a non-transitory computer readable medium and executable by at least one processor. The program instructions are executable to: (a) determine, from a plurality of possible communication types, a communication type of a communication associated with a first UE, wherein the first UE is capable of uplink CoMP communication via an access network; (b) based at least in part on the determined communication type, select either a battery-saving mode or a throughput-enhancement mode as an uplink CoMP enhancement mode for the first UE; and (c) provide uplink CoMP service to the first UE according to the selected mode.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

Further, methods and systems may be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

I. Exemplary Network Architecture

Figure 1A:
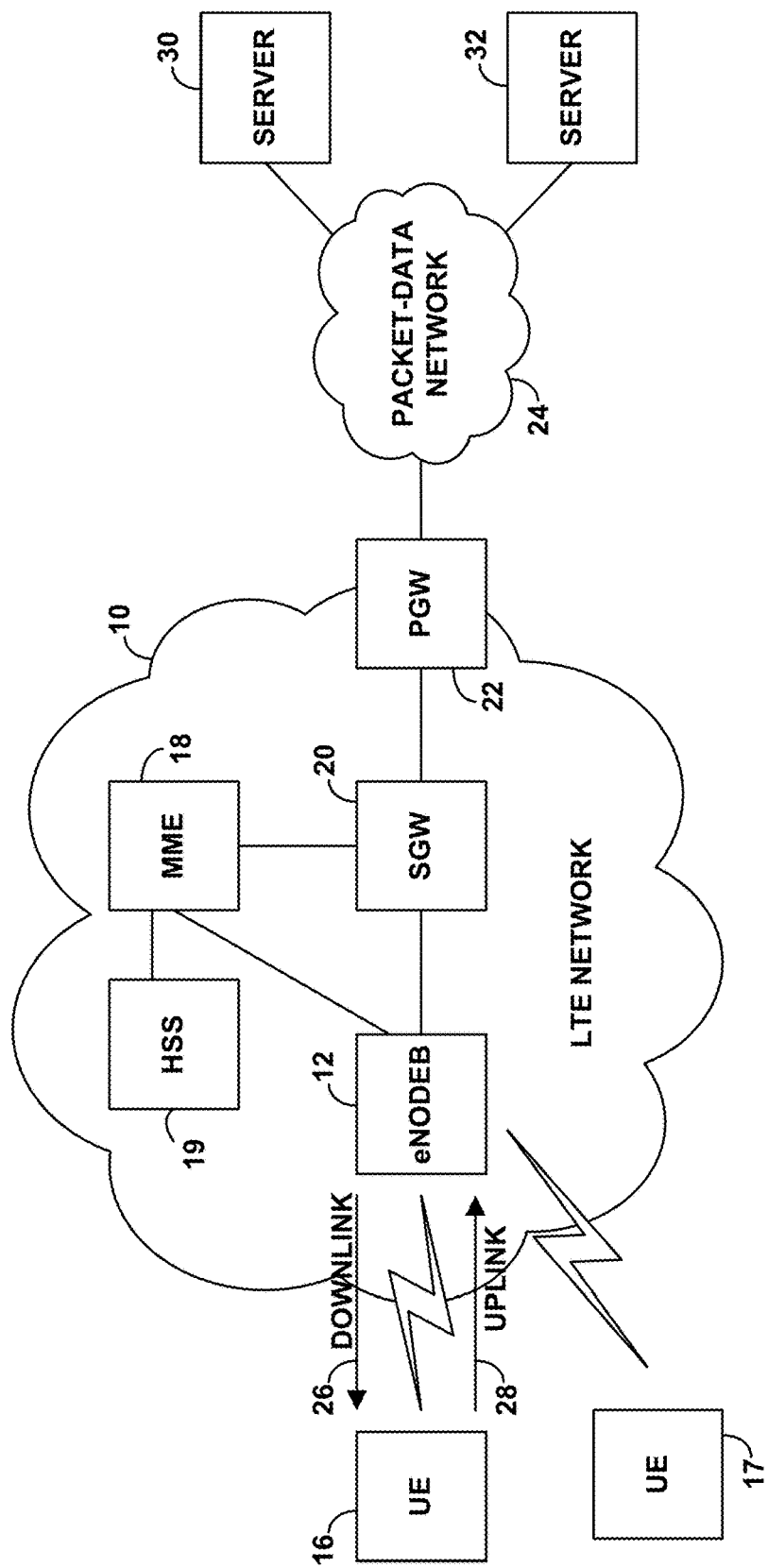
FIG. 1A is a simplified block diagram of a wireless communication system in which the present method and system can be implemented.

Referring to the drawings, FIG. 1A is a simplified block diagram of a wireless communication system in which the present method and system can be implemented. In particular, FIG. 1A depicts a representative LTE network 10, which functions primarily to serve UEs with wireless packet data communication service, including possibly voice-over-packet service, but may also provide other functions. As shown, the LTE network 10 includes a base station (eNodeB) 12, which has one or more antenna structures and associated equipment for providing one or more LTE coverage areas (e.g., cells) in which to serve UEs such as an example UE 16 as shown.

The eNodeB 12 has a communication interface with a mobility management entity (MME) 18 that functions as a signaling controller for the LTE network 10. Further, the eNodeB 12 has a communication interface with a serving gateway (SGW) 20. MME 18 may be communicatively coupled to a home subscriber server (HSS) 19, which stores subscriber information, and may also be communicatively coupled to the SGW 20. SGW 20 in turn has a communication interface with a packet-data network gateway (PGW) 22, which may provide connectivity with a packet-data network 24. In practice, the illustrated components of the LTE network 10 may sit as nodes on a private packet-switched network owned by an operator of the LTE network 10, and thus the various communication interfaces may be logical interfaces through that network.

As illustrated, the air interface 14 for a given cell served by eNodeB 12 may have a downlink direction 26 from the eNodeB 12 to the UE 16, and an uplink direction 28 from the UE 16 to the eNodeB 12. Further, the eNodeB 12 and the UE 16 may be configured (e.g., licensed and programmed) to support air interface communication on various particular carriers, which may be FDD or TDD, for example. Each such carrier and/or its particular downlink and uplink channels may be identified by one or more globally unique identifiers per industry standard, so that the eNodeB 12 and a served UE can refer to particular carriers by those identifiers.

According to LTE, each carrier's downlink channel may then define various sub-channels, such as a physical downlink control channel (PDCCH) for carrying scheduling directives and other control signaling from the eNodeB 12 to UEs, a physical downlink shared channel (PDSCH) for carrying scheduled downlink data communication, and a reference channel for carrying a reference signal that UEs can monitor to evaluate coverage quality. Likewise, each carrier's uplink channel may define various sub-channels, such as a physical uplink control channel (PUCCH) for carrying scheduling requests and other control signaling from the UEs to the eNodeB 12 and a physical uplink shared channel (PUSCH) for carrying scheduled uplink data communication.

With this arrangement, when the UE 16 enters into coverage of the eNodeB 12, the UE 16 may detect the eNodeB's 12 coverage on a particular carrier, and the UE 16 may engage in an attach process or handover process to register with the LTE network 10 on that carrier. For instance, the UE 16 may initially transmit to the eNodeB 12 an attach request, which the eNodeB 12 may pass along to the MME 18, triggering a process of authenticating the UE 16 and establishment of one or more logical bearer connections for the UE 16 between the eNodeB 12 and the PGW 22. For example, LTE network 10 may initially establish a default bearer for carrying general Internet traffic (e.g., web browsing, e mail messaging, or the like) between UE 16 and packet-data network 24. As another example, if UE 16 subscribes to an IMS-based service such as VoIP, LTE network 10 may initially establish an IMS signaling bearer for carrying control signaling (e.g., SIP signaling) between UE 16 and IMS platform (not shown) to facilitate setup of IMS-based communication sessions.

Each of these bearers may have a designated quality-of-service (QoS) level or traffic class. In one implementation, this QoS level or traffic class may be represented as a QoS class indicator (QCI), which defines various QoS parameters (e.g., priority, delay, loss rate, etc.) for how the entities of the LTE network are to handle the packet-data transmission on the bearer. QCI values typically range from 1 to 9, with a QCI of 1 representing the highest QoS level and a QCI of 9 representing the lowest QoS level (sometimes referred to as "best efforts"). Using these QCI values as a point of reference, the LTE network may normally select a QCI of 9 for the default Internet bearer and a QCI of 5 for the IMS signaling bearer (but other QCI values could be used as well).

In a further aspect of LTE, the eNodeB 12 may determine the communication type of a communication for which a UE 16 has requested resources and/or in which a UE 16 is engaged in various ways. For instance, when a UE attaches to the network and/or when a UE 16 sends a service request to initiate a communication, the eNodeB 12 may determine the website or destination server indicated by the request (e.g., as indicated by an IP address included in the request). The eNodeB 12 may then determine a communication type that is typically associated with the website or destination server. Additionally or alternatively, the eNodeB 12 may determine a communication type based on deep packet inspection (DPI) of one or more packets passing to or from the UE 16, and/or based on various associated signaling or other data.

To do this, the eNodeB 12 may include or have access to a table that maps various websites, network addresses and/or port numbers to corresponding types of content (e.g., indicating for each network address one or more possible types of content, and further indicating for each port associated with data sent to or from that network address a corresponding type of content), and the eNodeB 12 may be programmed to refer to that table to determine the communication type, which may be indicative of the type of content and/or the manner in which content is communicated during a particular communication.

Other techniques for determining the communication type of a communication associated with a UE are also possible.

II. Coordinated Multipoint

As noted above, a network such as communication network 10 may implement various types of coordinated multipoint (CoMP) service, through which base stations (e.g., eNodeBs) may coordinate to improve uplink and/or downlink service. As noted above, CoMP schemes designed for coordinated transmission by base stations may be referred to as downlink CoMP modes, while CoMP schemes designed for coordinated reception may be referred to as uplink CoMP modes.

Figure 1B:
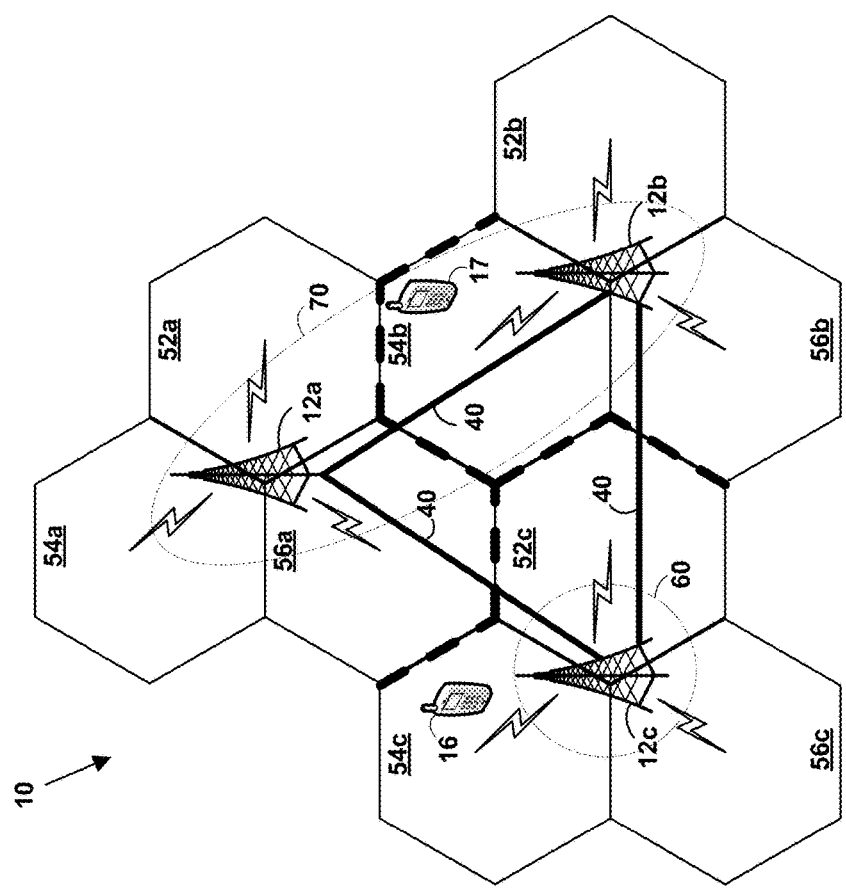
FIG. 1B is a simplified block diagram illustrating a portion of communication network in which coordinated multipoint may be implemented for uplink and/or downlink communications, according to exemplary embodiments.

FIG. 1B is a simplified block diagram illustrating a portion of communication network 10 in which CoMP schemes may be implemented for uplink and/or downlink communications. In particular, FIG. 1B shows a portion of an LTE network, which includes three eNodeBs 12a to 12c. More or less eNodeBs, and/or other types of access points or base transceiver stations, are also possible.

As shown, eNodeB 12a is serving three coverage areas or cells 52a, 54a, and 56a, eNodeB 12b is serving three coverage areas or cells 52b, 54b, and 56b, and eNodeB 12c is serving three coverage areas or cells 52c, 54c, and 56c. Further, a UE 16 is operating in cell 54c, which is served by eNodeB 12c. Further, while not shown in FIG. 1B, each eNodeB 12a to 12c may be configured in the same or in a similar manner as the eNodeB 12 shown in FIG. 1A. For instance, each eNodeB 12a to 12c may be communicatively coupled to an MME and/or an SGW. Further, note that some or all of eNodeBs 12a to 12c may be communicatively coupled to the same MME and/or the same SGW. Alternatively, each eNodeB 12a to 12c might be connected to a different MME and/or different SGW.

In some cases, uplink CoMP may be implemented by a single base station, which provides service in multiple cells.

This type of CoMP scheme may be referred to as an "intra base station" or "intra-eNodeB" CoMP scheme. For example, eNodeB 12c may provide uplink CoMP by utilizing and/or combining uplink signals from a UE that are received at two or more of the cells 52c, 54c, and 56c that are served by eNodeB 12c. In particular, eNodeB 12c may define a CoMP coordinating set 60 for a UE to include all its cells 52c, 54c, and 56c. As such, eNodeB 12c may adaptively use joint processing techniques and/or interference rejection combining (IRC) techniques when the uplink signal from UE 16 is received at two or more of the cells 52c, 54c, and 56c that it serves.

In other cases, uplink CoMP may be implemented by multiple base stations, which may each provide service in multiple cells or only in one cell. This type of CoMP scheme may be referred to as an "inter base station" or "inter-eNodeB" CoMP scheme. For example, eNodeBs 12a and 12c may provide uplink CoMP by utilizing and/or combining uplink signals from a UE 17 that are received at two or more of the cells 52a, 54a, 56a, 52b, 54b, and 56b that are served by eNodeBs 12a and 12b. (Those skilled in the art will understand that in the context of CoMP the "uplink signals" received at different base stations result from the same uplink signal that is transmitted by the UE, but are different because the transmission is "perceived" differently in the different cells.)

When uplink CoMP involves multiple base stations (e.g., inter-base station CoMP), the base stations may coordinate with one another via a backhaul network, which allows for communications between base stations and/or other network components. For example, in an LTE network, eNodeBs may communicate via links that are referred to as X2 interfaces. X2 is described generally in Technical Specification ETSI TS 136 420 for LTE; Evolved Universal Terrestrial Radio Access Network (E-UTRAN); X2 general aspects and principles. In FIG. 1B, eNodeBs 12a to 12c are communicatively connected via X2 links 40. It should be understood, however, that other types of backhaul communications are also possible.

The set of cells that cooperate to provide uplink CoMP to a given UE may be referred to herein as the UE's "cooperating set" for uplink CoMP. The cooperating set may thus include a "serving cell" and one or more other "cooperating cell(s)". In practice, the eNodeB for the serving cell in a UE's CoMP cooperating set (or another network entity) may determine the other cell or cells that coordinate to provide uplink CoMP for a given UE, at a given point in time. More specifically, in some implementations, selection of cells for the cooperating set may be determined from cells listed in a "measurement set", for which the UE measures and reports signal strength and/or other channel state information. Additionally or alternatively, selection of eNodeBs for the cooperating set may be based on various factors, including, but not limited to, whether or not a signal from the given UE is received in a candidate cell, signal strength measurements, other indicators of air interface conditions, and/or processing load at eNodeBs serving cells in the measurement set, among other possibilities.

Uplink CoMP service can involve joint reception of the UE's uplink signal in two or more cells in a UE's cooperating set. The data transmitted on the PUSCH by a given UE may therefore be received by each eNodeB in the UE's cooperating set. The PUSCHs received in the different cells in each frame can then combined using various joint processing techniques, such as a mean squared error (MMSE) or zero forcing (ZF) process, among other possibilities. Further, joint reception and joint processing may be combined with other types of uplink CoMP techniques, such as interference rejection combining (IRC), adaptive antennas, and/or multi-user detection schemes, in an effort to further improve performance and/or for other reasons.

In some implementations, joint processing involves the eNodeB of each cooperating cell sending the eNodeB of the serving cell the received uplink signal via an X2 interface, without having decoded the received signal. Specifically, eNodeB(s) for the cooperating cell(s) may send raw I/Q data to the eNodeB for the serving cell via X2 interface(s) between these eNodeBs. The raw I/Q data may include all the physical layer bits received by the eNodeB.

In other implementations, joint processing may involve the eNodeB for each cooperating cell decoding a received signal before sending it to the eNodeB for the serving cell. For example, the decoding process may involve the eNodeB for each coordinating cell extracting user data (e.g., packet data) from the physical layer bits in the received uplink signal, such as by removing phase information represented by I/Q bits in the received signal, and/or removing other non-user data from the received signal, before coordinating with the eNodeB for the serving cell. The serving-cell eNodeB may then compare the decoded signal received from the coordinating cells to the decoded signal from the serving cell, and select the best decoded signal. Alternatively, the decoded signal received in the serving cell can be combined with the decoded signals from the cooperating cells in each frame, in order to generate a combined signal for the particular UE.

III. Enhancement Modes for Uplink CoMP

As noted above, uplink CoMP modes, such as joint reception, can provide gain in the uplink by combining a given UE's PUSCH transmissions received in multiple cells. The uplink gain provided in the PUSCH SINR can help to improve the quality of service and/or throughput provided to a UE 16, particularly in cell edges. According to some current implementations of uplink CoMP, the network (e.g., an eNodeB) can switch between different enhancement modes, which vary the way in which the gain in the PUSCH SINR is utilized.

In an exemplary embodiment, a network may be configured to switch between two uplink CoMP enhancement modes: a battery-saving mode and a throughput-enhancement mode. When uplink CoMP service is provided according to battery-saving mode, the gain provided by uplink CoMP (e.g., by joint reception) is utilized to allow the UE to reduce its transmission power, which in turn can reduce the amount of power a UE utilizes for a given transmission. When uplink CoMP service is provided according to the throughput-enhancement mode, the gain provided by uplink CoMP (e.g., by joint reception) is utilized to enhance the uplink throughput of the UE.

Note that when uplink CoMP service is provided according to the throughput-enhancement mode, a UE may be permitted to transmit with a higher transmission power than it otherwise might. The higher transmission power will typically result in the UE's transmission range increasing, which can potentially increase the number of cells in which the UE's uplink transmissions can be received. Thus, in addition to improving gains from joint reception in a given cooperating set (e.g., in same set of cells that would provide uplink CoMP to a UE in the battery-saving mode), the throughput-enhancement mode can, in some scenarios, increase the number of cells that that receive the PUSCH (e.g., increase the size of the UE's cooperating set). This increase in the number of cells providing diversity reception can further enhance uplink throughput and/or quality of service gains from uplink CoMP. For instance, in the scenario illustrated in FIG. 1B, UE 17 may have a larger cooperating set 70 due to an extended transmission range as the result of uplink CoMP service according to the throughput-enhancement mode, whereas UE 16 may have a lesser transmission range and a smaller cooperating set 60, as the result of uplink CoMP service according to the battery-saving mode.

In practice, the selected uplink CoMP enhancement mode may be implemented by way of selecting and assigning different modulation and coding schemes (MCSs) to a UE. For instance, when the throughput-enhancement mode is utilized to provide uplink CoMP for a given UE, an eNodeB may select a MCS that is designated for the throughput-enhancement mode (e.g., an MCS providing for 64-QAM). Similarly, when the battery-saving mode is utilized to provide uplink CoMP for a given UE, an eNodeB may select a MCS that is designated for the battery-saving mode (e.g., an MCS providing for 16-QAM).

IV. QoS Class Identifiers

As noted above, each of a UE's bearer connections with an LTE network may be assigned a QoS class indicator (QCI), which defines various QoS attributes for the communication using that bearer. As further noted above, QCI values typically range from 1 to 9, with a QCI of 1 representing the highest QoS level and a QCI of 9 representing the lowest QoS level (sometimes referred to as "best efforts").

In some embodiments, QCI 1 to QCI 4 may be defined so as to provide a guaranteed bit rate (GBR) to traffic flows assigned thereto, and thus may be referred to as GBR QCIs. Further, QCI 5 to QCI 9 may be defined so as to provide a variable bit rate for traffic flows assigned thereto, and thus may be referred to as non-GBR QCIs. As such, QCIs 5 through 9 may correspond to non-guaranteed bit rate types of wireless communication, such as IMS signaling, TCP-based communications (e.g., Web browsing, email, chat, FTP, etc.), as well as non-guaranteed bit rate voice and video services, among other possibilities.

In an exemplary LTE network, a QCI 1 bearer has a high level of QoS and may therefore be assigned for conversational voice communications, such as VoIP calls and VoLTE calls. Further, a QCI 4 bearer is a GBR bearer having a mid-level of QoS and is associated specifically with non-conversational video streaming, whereas a QCI 5 bearer is a best-efforts (non-GBR) bearer having mid-level QoS, which can be assigned for IMS signaling, and a QCI 9 bearer is a best-efforts bearer having low-level QoS and is associated specifically with general Internet (e.g., TCP-based) traffic such as e-mail, chat, file transfer, video (buffered streaming), and the like.

In practice, when a UE engages in a communication via an LTE network, the uplink and/or downlink traffic flows may be assigned the QCI that is associated with the particular type of application and/or the particular type of traffic flow. Accordingly, the QCI assigned for a particular communication may be used as an indicator of communication type. (Note that the QCI may be the sole indicator of communication type, or could be used in combination with other information to determine communication type.)

In a further aspect, the QCI may be used as an indication of a data-usage class associated with a UE. More specifically, a service provider may have configured network 10 such that assignment of QCIs for a given UE's communications is further based on the data usage class indicated by the user account or accounts associated with the given UE. In an exemplary embodiment, network 10 may associate QCI 8 with user accounts that utilize significantly more network resources than average (e.g., more than some threshold amount of data per month), and may select a QCI other than QCI 8 for communications associated a user account that is not designated as a heavy user (e.g., those that use less than some threshold amount of data per month).

Thus, when a user account indicates a particular user has utilized more than a threshold amount of data in a billing cycle, the user account may be associated with a heavy data-usage class, such that QCI 8 will be assigned to communications of UEs associated with such accounts when it otherwise might not be. Other user accounts may be associated with a standard data-usage class. More granular definition of three or more data-usage classes is also possible.

As a specific example, in FIG. 1B, UE 16 may be associated the user-account of a heavy user, while UE 17 may be associated with the user-account of a normal or standard user. As such, eNodeB 12 may assign QCI 8 to traffic flows to and from UE 16, and may assign other QCIs to the same types of traffic flows to and from UE 17 (e.g., for the same types of communications).

When an LTE network is configured to assign QCI 8 to communications of heavy data users, the QCI of a given communication can also be used as an indicator of the data-usage class. For example, when a UE 16 is assigned QCI 8 for a given communication, eNodeB 12 may infer that the UE 16 is associated with the account of a heavy data user. And, when a UE 17 is assigned QCI 1, QCI 5, or QCI 9, for example, eNodeB 12 may infer that the UE 17 is associated with the account of a standard user (or simply that the UE is not classified by a heavy data-usage class).

V. Exemplary Network Components

Figure 2:
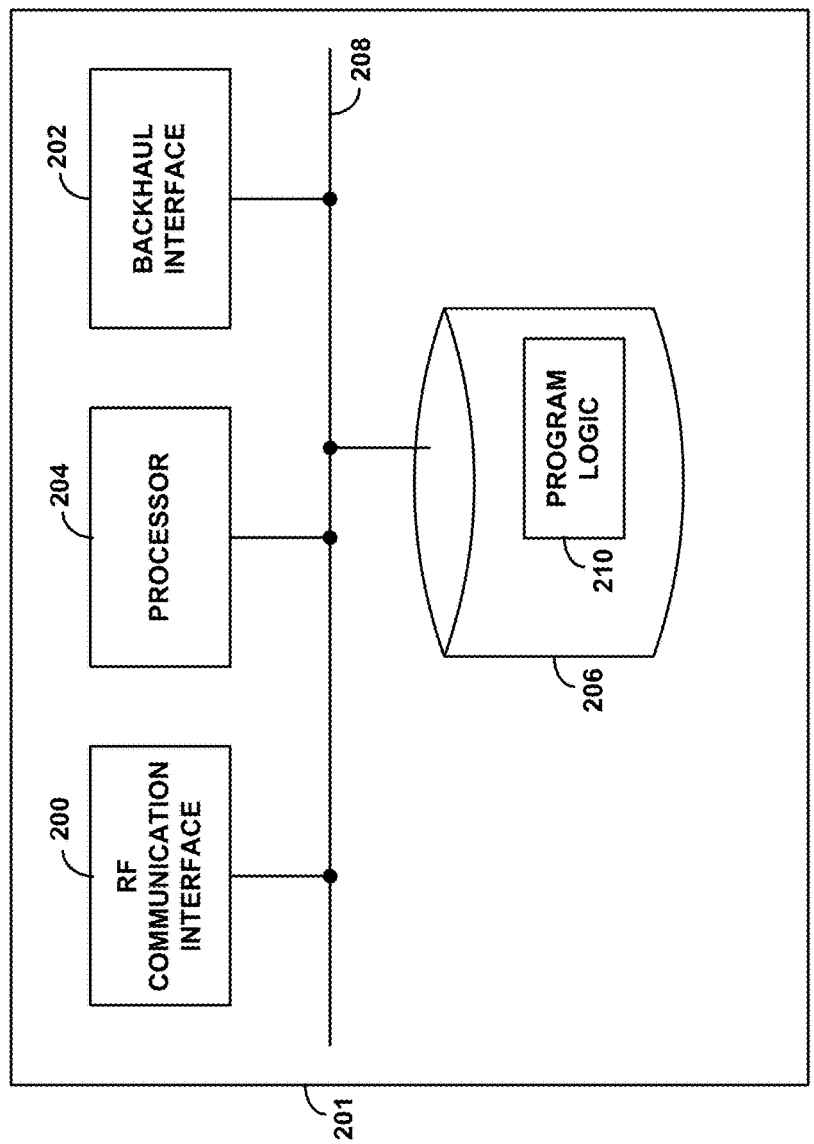
FIG. 2 is a simplified block diagram illustrating a network component, according to an exemplary embodiment.

FIG. 2 is a simplified block diagram exemplifying a network component, according to an exemplary embodiment. In particular, FIG. 2 illustrates functional components that might be found in a network component 201 that is arranged to operate in accordance with the embodiments herein. As shown, the network component 201 may include a communication interface 200, a backhaul interface 202, a processor 204, and data storage 206, all of which may be communicatively linked together by a system bus, network, or one or more other connection mechanisms 208.

In practice, network component 201 may take the form of an eNodeB, or may take the form of another component of an LTE or CDMA network. Further, the illustrated components of network component 201 (e.g., communication interface 200, a backhaul interface 202, a processor 204, and/or data storage 206) may be distributed and/or subdivided between one or more entities in an LTE network and/or in a CDMA network. It should be understood that an exemplary system may also take the form of another network entity or combinations of other network entities, without departing from the scope of the invention.

In network component 201, communication interface 200 may comprise one or more or wired or wireless communication interfaces and/or other associated equipment for engaging in communications with other network entities and/or for engaging in RF communications with mobile stations according to one or more air interface protocols. Chipsets, antennas, and/or other components for such RF communications are readily available and well known to those skilled in the art. Backhaul interface 202 may comprise any sort of communication link or mechanism enabling the network component 201 to exchange signaling and bearer data with other network entities, such as an X2 link, for instance. Further, processor 204 may comprise one or more processors (e.g., general purpose and/or special purpose processors), such as microprocessors for instance. Chipsets, ports, and/or other components for such backhaul communications are readily available and well known to those skilled in the art.

Data storage 206 may be a non-transitory computer readable medium. For example, data storage 206 may take the form of one or more volatile and/or non-volatile storage components, such as magnetic, optical, or organic storage components, integrated in whole or in part with processor 204. As further shown, data storage 206 contains program logic 210 (e.g., machine language instructions) executable by processor 204 to carry out various functions, such as the functionality of the exemplary methods and systems described herein.

In an exemplary embodiment, communication interfaces 200 may include an RF communication interface configured to receive an uplink signal from a UE in a first cell, where two or more other cells are in a coordinated multipoint (CoMP) group with the first cell. Further, the network component may include program instructions stored in data storage 206, which are executable by processor 204 to provide the functionality of network components described herein, including but not limited to the methods described in FIGS. 3, 4, and 5.

VI. Exemplary Methods

Figure 3:
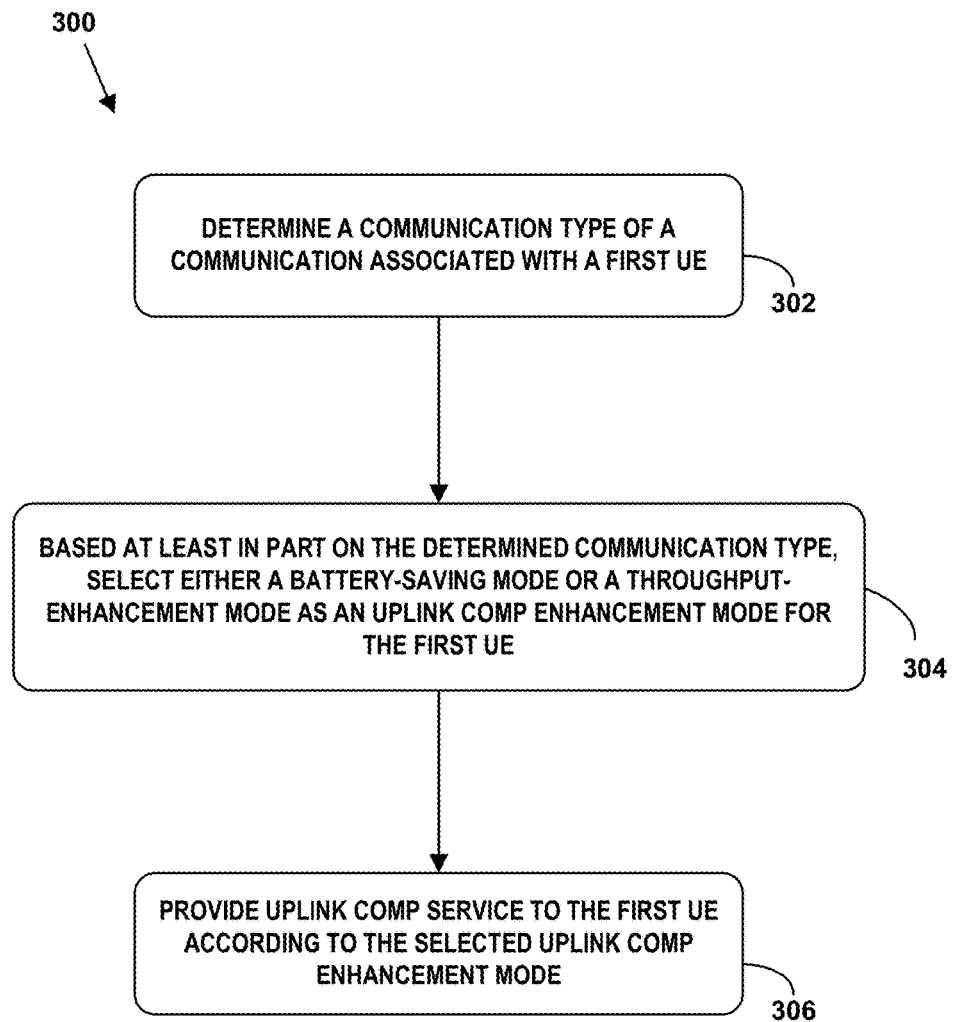
FIG. 3 is flow chart illustrating a method, according to an exemplary embodiment.

FIG. 3 is flow chart illustrating a method 300, according to an exemplary embodiment. Method 300 may be implemented by a base station (e.g., an eNodeB). Of course, it should be understood that method 300 or portions thereof may be implemented by other entities or combinations of entities, and/or may be implemented for other purposes, without departing from the scope of the invention.

As shown by block 302, method 300 involves an eNodeB determining, from a plurality of possible communication types, a communication type of a communication associated with a first UE. (Note that in this embodiment, it is assumed that the first UE is capable of uplink CoMP communication.) Then, based at least in part on the determined communication type, the eNodeB selects either a battery-saving mode or a throughput-enhancement mode as an uplink CoMP enhancement mode for the first UE, as shown by block 304. The eNodeB then provides uplink CoMP service to the first UE according to the selected enhancement mode, as shown by block 306.

A. Determining a Communication Type

At block 302, the eNodeB may use various techniques to determine the communication type of a UE's communication. For example, as explained above, an eNodeB 12 can determine the type of QCI assigned to the bearer, and interpret the QCI as an indication of the type of communication for which the UE is requesting and/or utilizing the bearer.

Additionally or alternatively, the UE may determine which application or the type of application for the UE is requesting and/or utilizing network resources. To determine the type of application, the UE may analyze a request and/or packet data to determine, e.g., an IP address of a destination server or the type of application session to which the packet data belongs. Further, in some embodiments, the eNodeB may determine both the QCI assigned to the bearer for a communication, and the application type (e.g., as indicated by a destination server), in order to select the uplink CoMP enhancement mood that should be utilized for a UE.

To do this, the eNodeB 12 may include or have access to a table that maps various websites, network addresses and/or port numbers to corresponding types of content (e.g., indicating for each network address one or more possible types of content, and further indicating for each port associated with data sent to or from that network address a corresponding type of content), and the eNodeB 12 may be programmed to refer to that table to determine the communication type, which may be indicative of the type of content and/or the manner in which content is communicated during a particular communication.

Furthermore, it should be understood that the techniques for determining communication type described herein are not intended to be limiting. Other techniques for determining the communication type are also possible.

B. Selecting an Uplink CoMP Enhancement Mode

As noted, block 606 may involve an eNodeB selecting an enhancement for uplink CoMP. In particular, the eNodeB selects between a battery-saving mode and a throughput-enhancement mode for use by a UE, while the UE is utilizing uplink CoMP for its uplink communications. Further, the selection at block 406 is based on the communication type associated with a UEs communication. The UE may also consider other factors when selecting the uplink CoMP enhancement mode, such the application to which a communication relates, whether the user-account associated with the UE has a heavy data-user classification, and/or whether the UE is capable of uplink CoMP, among other possibilities.

In some embodiments, if the assigned QCI indicates a communication is a VoIP or VoLTE call (e.g., if QCI 1 is assigned), then the eNodeB will typically select and utilize the battery-saving mode to provide uplink CoMP to the first UE. More generally, when the QCI indicates a GBR bearer is being utilized for a communication, and that the QoS of the communication is typically latency-dependent as opposed to throughput-dependent. Thus, the battery-saving mode may be utilized to provide uplink CoMP for communications assigned QCI 1 to QCI 4.

On the other hand, if a communication is assigned a non-GBR bearer (e.g., QCI 5 to QCI 7, or QCI 9), this may be interpreted as an indication that the application could be throughput-dependent, and might benefit from use of the uplink CoMP throughout enhancement mode. However, for certain communications assigned to a non-GBR bearer (e.g., QCI 9), other factors may indicate more reliably whether the communication will or will not benefit from increased uplink throughput. For example, some types of communication and/or application sessions, which might be assigned QCI 9 or another non-GBR bearer, may, on average, involve more downlink traffic, and/or very little uplink traffic. Examples may include, but are not limited to, audio and/or video streaming, and browsing on a social network webpage or application, among other possibilities. Thus, when an eNodeB determines that a UE's communications are part of such an application session (e.g., as indicated by the IP address of a destination server), the eNodeB may select the battery-saving mode, even if the communications are assigned a non-GBR bearer.

On the other hand, certain application or communication types may be considered likely to benefit from increased uplink throughput. For example, if an eNodeB determines that a communication a file upload, such as an upload using file transfer protocol (FTP), or a photo or video upload to a video sharing service or social network, the eNodeB may responsively use the throughput enhancement mode to provide uplink CoMP service to the UE.

Furthermore, it should be understood that the techniques for selecting an uplink CoMP enhancement mode described herein are not intended to be limiting. Other techniques taking into account other factors and/or other combinations of factors when selecting an uplink CoMP enhancement mode are also possible. Furthermore, it is possible that additional uplink CoMP enhancement modes could be defined, in addition or in the alternative to the battery saving mode and the throughput enhancement mode. Accordingly, selection from a set of more than two different uplink CoMP enhancement modes and/or from a set including different uplink CoMP enhancement modes is also possible.

C. Providing Uplink CoMP According to the Selected Enhancement Mode

At block 308, uplink CoMP may be provided to the UE according to the particular enhancement mode selected at block 406. In an exemplary embodiment, an eNodeB may implement the selected CoMP enhancement mode by selecting a modulation and coding scheme (MCS) from a set of possible MCSs, which corresponds to the particular enhancement mode, such that the given UE engages in uplink communication according to the corresponding MCS. Alternatively, the eNodeB could send a message to the UE that explicitly indicates the selected enhancement mode for uplink CoMP, such that the UE will carry out its uplink transmissions accordingly.

D. Conditional Performance Based on Uplink CoMP Capability

In some embodiments, exemplary methods for selection of an uplink CoMP enhancement mode (e.g., between a battery-saving mode and a throughput-enhancement mode) may be conditioned upon an initial determination that a UE is capable of uplink CoMP. More specifically, an eNodeB may initially determine whether or not a UE is capable of uplink CoMP, and condition the performance of method 300 (or another exemplary method) upon an initial determination that the UE is in fact capable of uplink CoMP.

Figure 4:
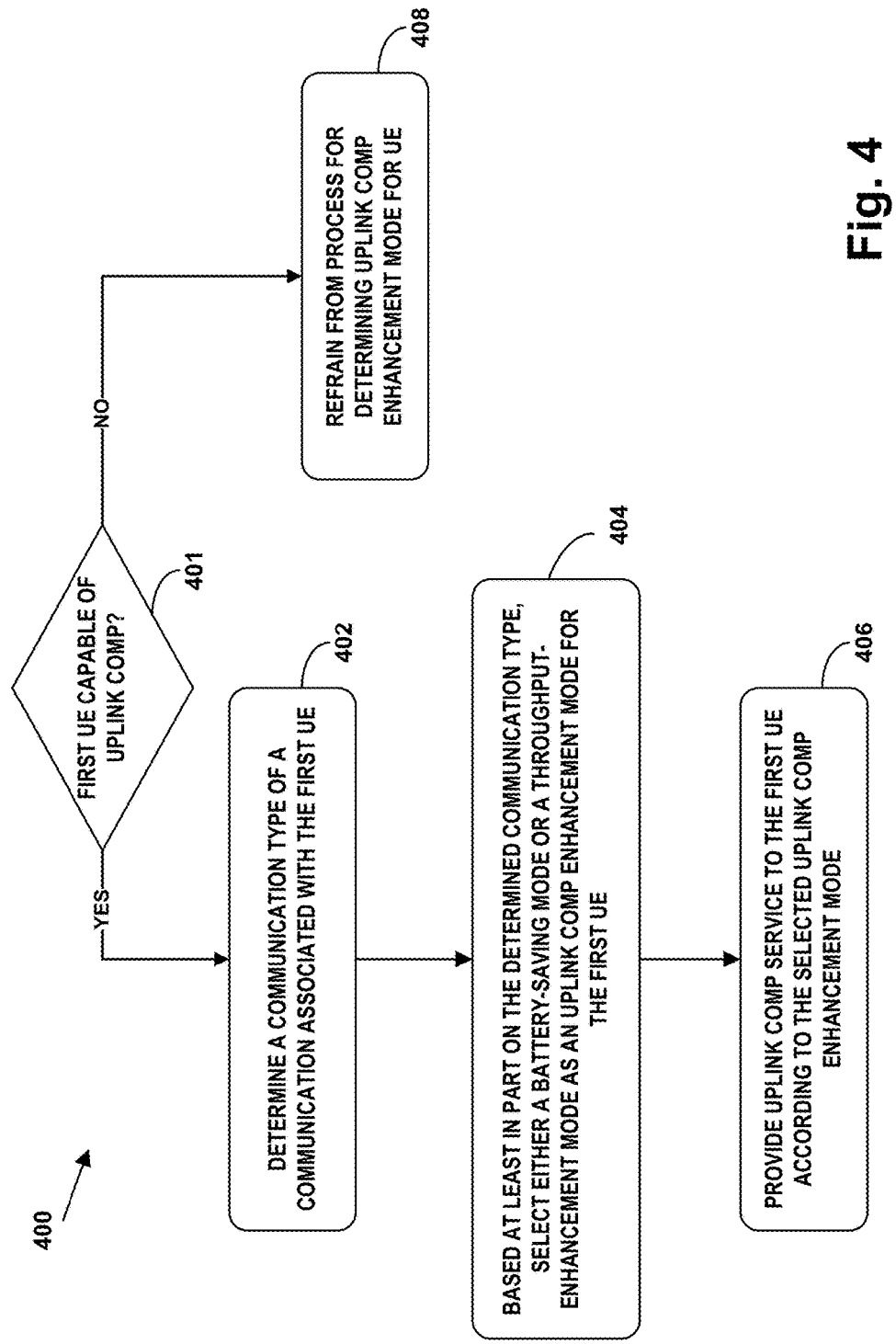
FIG. 4 is flow chart illustrating another method, according to an exemplary embodiment.

For example, FIG. 4 is a flow chart illustrating an exemplary method 400, where the process for selecting an enhancement mode is conditioned upon a UE being capable of uplink CoMP. Method 400 begins at a decision block 401, where the eNodeB determines whether or not the UE is capable of uplink CoMP. If the UE is determined to be capable of uplink CoMP, the eNodeB continues to perform blocks 402 to 406. Blocks 402 to 406 may be implemented in the same or a similar manner to blocks 302 to 306 of method 300, respectively. On the other hand, if the UE is determined not to be capable of uplink CoMP, then the eNodeB refrains from performing an example method to select an uplink CoMP enhancement mode, as shown by block 408.

In a further aspect, various techniques may be used to determine that a particular UE is capable of uplink CoMP. In some cases, the eNodeB may determine whether the UE is capable of CoMP in its current situation (e.g., at the UE's current location and/or with the UE's current operating parameters). For instance, to reach the decision made at block 501 (or the alternate conclusion that a UE is not capable of CoMP), an eNodeB may evaluate whether or not the UE's PUSCH transmissions are received in more than one cell in a cooperating set (and perhaps require reception at some minimum level). As such, the eNodeB may determine that a UE is capable of uplink CoMP when the uplink signal from the UE is jointly received (i.e., in the same frame) in two or more cells in a CoMP cooperating set. In practice, this could involve the eNodeB determining that a UE's PUSCH transmissions have been received jointly in multiple cells, such that the signals can combined (e.g., using IRC) in effort to improve the received signal quality.

In other cases, the eNodeB might evaluate whether a given UE is capable of CoMP by determining whether or not the given UE is configured for CoMP (e.g., whether or not the UE has the appropriate software, hardware, and/or firmware for CoMP), and/or whether eNodeBs near to a UE are configured to provide uplink CoMP (e.g., whether or not the eNodeB(s) near the UE have the appropriate software, hardware, firmware, and/or backhaul links to provide uplink CoMP). Other techniques for determining whether a UE is capable of uplink CoMP are also possible.

E. Conditional Performance Based on Data-Usage Class

As noted above, some users may be classified as heavy data users. Thus, in interest of fairness, a wireless service provider may regulate, reduce, and/or disable certain services and features for heavy data users. To facilitate such functionality, a service provider may define two or more data-usage classes, such that one of the data-usage classes can be associated with each user account based on the data usage associated with the account. In some implementations a service provide may disable uplink CoMP, reduce the available features of uplink CoMP, and/or place restrictions on when and/or how uplink CoMP can be utilized by a UE associated with a heavy data user. Accordingly, in some embodiments, methods for selection of an uplink CoMP enhancement mode (e.g., between a battery-saving mode and a throughput-enhancement mode) may be conditioned at least in part upon the particular data-usage class that is associated with a given UE.

Figure 5:
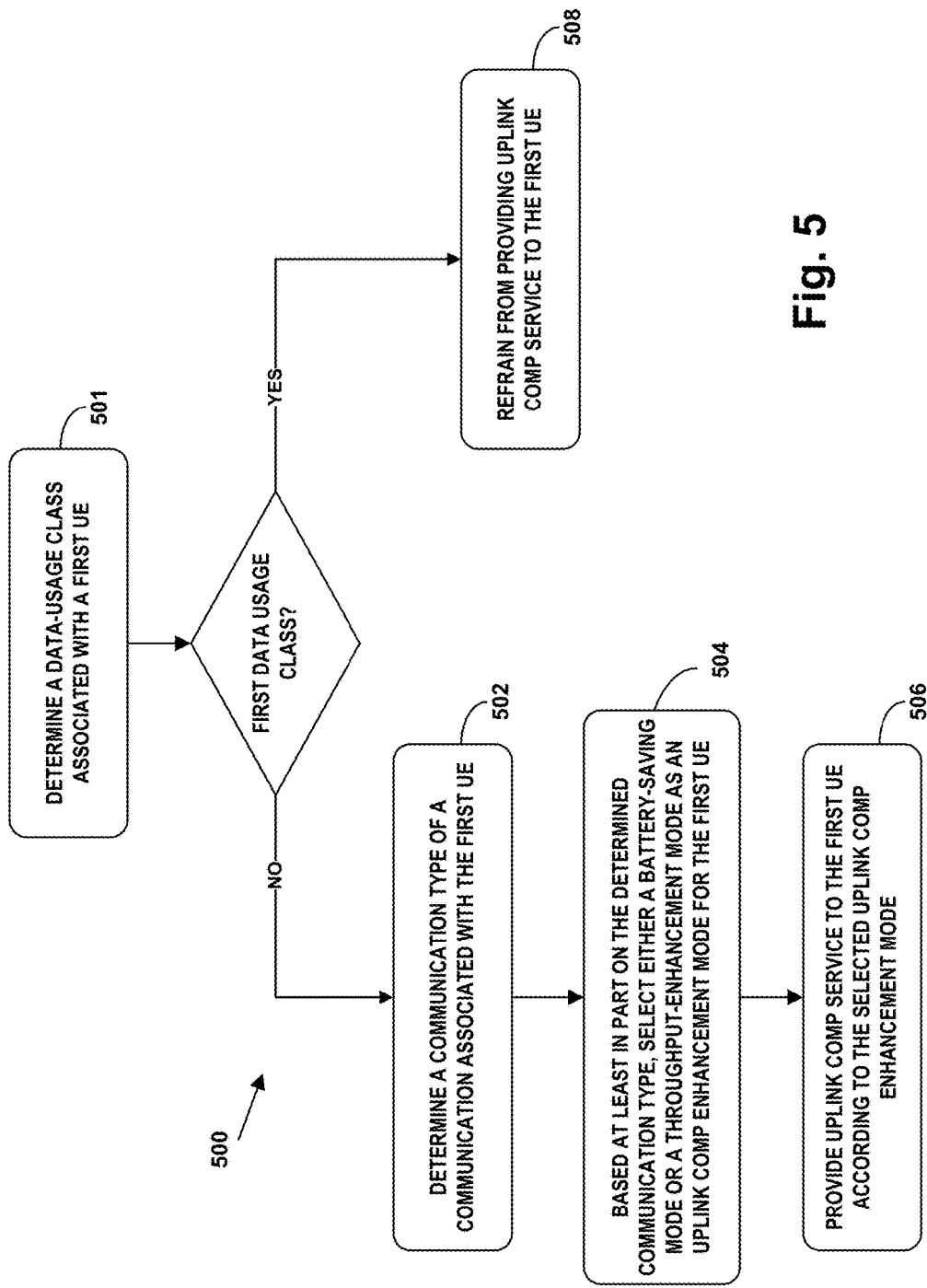
FIG. 5 is flow chart illustrating yet another method, according to an exemplary embodiment.

For example, FIG. 5 is a flow chart illustrating an exemplary method 500, where a decision as to whether or not to proceed with a process to select an uplink CoMP enhancement mode is based at least in part on the data-usage class associated with the UE. Method 500 begins at a block 501, where the eNodeB determines a data-usage class that is associated with a first UE. In example embodiments, the data-usage class that is determined at 501 may be selected from a set of pre-defined data-usage classes that include at least a first and a second data-usage class (e.g., a heavy data-usage class and a standard or non-heavy data-usage class).

When the first data-usage class (e.g., a class associated with heavy data users) is not associated with the first UE, the eNodeB continues to perform blocks 502 to 506. Blocks 502 to 506 may be implemented in the same or a similar manner to blocks 302 to 306 of method 300, respectively. On the other hand, when the first (e.g., heavy) data-usage class is associated with the first UE the eNodeB may refraining from providing uplink CoMP service to the first UE, as shown by block 508. In alternative embodiments, when the first (e.g., heavy) data-usage class is associated with the first UE, the eNodeB might provide the first UE with uplink CoMP with a reduced feature set, where dynamic selection of the uplink CoMP enhancement mode (e.g., provided by implementing blocks 502 to 506) is disabled.

Note that in method 500, it is assumed that the first UE is capable of uplink CoMP. In other embodiments, this might not be assumed. As such, it is possible that performance of blocks 502 and 506 could be conditioned on the first UE not being associated with heavy data-usage class and being capable of uplink CoMP.

VII. Conclusion

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A method comprising:
   determining, from a plurality of possible communication types, a communication type of a communication associated with a first user equipment (UE), wherein the first UE is capable of uplink coordinated multipoint (CoMP) communication via an access network, and wherein a battery-saving mode and a throughput-enhancement mode are selectable for CoMP communication in the access network;
   based at least in part on the determined communication type, selecting either the battery-saving mode or the throughput-enhancement mode as an uplink CoMP enhancement mode for the first UE, wherein uplink CoMP according to the battery-saving mode utilizes gain from joint reception on the physical uplink shared channel (PUSCH) to facilitate a lower transmission power by the first UE, wherein uplink CoMP according to the throughput-enhancement mode utilizes gain from joint reception to facilitate greater uplink throughput by the UE, and wherein, when the determined communication type is a voice-over-LTE (VoLTE) call the battery-saving mode is selected for uplink CoMP transmissions by the first UE; and
   providing uplink CoMP service to the first UE according to the selected mode.

2. The method of claim 1, wherein the determination of the communication type is based at least in part on a quality-of-service class identifier (QCI) of the communication.

3. The method of claim 1, wherein the determined communication type is a general communication type, and wherein the throughput-enhancement mode is selected for uplink CoMP transmissions by the first UE.

4. The method of claim 1, wherein the communication type is determined based on an IP address indicated in the communication.

5. The method of claim 1, wherein the determined communication type is a file transfer, and wherein the throughput-enhancement mode is selected for uplink CoMP transmissions by the first UE.

6. The method of claim 1, further comprising:
   determining an application associated with the communication; and
   using the determined application as a further basis for selecting either the battery-saving mode or the throughput-enhancement mode as the uplink CoMP enhancement mode for the first UE.

7. The method of claim 6, wherein the determined application is a social-media application, and wherein the battery-saving mode is selected for uplink CoMP transmissions by the first UE.

8. The method of claim 1, wherein the method is carried out by an eNodeB from the access network.

9. The method of claim 8, wherein the eNodeB is part of cooperating set of eNodeBs that provide uplink CoMP service to the first UE.

10. The method of claim 1, further comprising:
    initially determining that the first UE is capable of uplink CoMP communication via the access network; and
    in response to determining that the first UE is capable of uplink CoMP performing the method of claim 1.

11. The method of claim 10, wherein determining that the first UE is capable of uplink CoMP comprises determining that the UE is configured to transmit uplink communications in accordance with an uplink CoMP scheme.

12. The method of claim 10, wherein determining that the first UE is capable of uplink CoMP comprises determining that an uplink signal from the UE has been jointly received in two or more cells.

13. The method of claim 1, further comprising:
    initially determining a data-usage class that is associated with the UE, wherein the data-usage class is one of a plurality of pre-defined data-usage classes comprising at least a first and a second data-usage class;
    wherein the access network disables uplink CoMP for the first UE when the first data-usage class is associated with the first UE; and
    wherein the performance of the method of claim 1 is conditioned upon the first UE being associated with a data-usage class other than the first data-usage class.

14. A method comprising:
    determining a data-usage class that is associated with a first user equipment (UE), wherein the data-usage class is one of a plurality of pre-defined data-usage classes comprising at least a first and a second data-usage class;
    when the first data-usage class is not associated with the first UE and the first UE is capable of uplink coordinated multipoint (CoMP) communication:
    (a) determining, from a plurality of possible communication types, a communication type of a communication associated with the first UE, wherein a battery-saving mode and a throughput-enhancement mode are selectable for CoMP communication;
    (b) based at least in part on the determined communication type, selecting either the battery-saving mode or the throughput-enhancement mode as an uplink CoMP enhancement mode for the first UE, wherein uplink CoMP according to the battery-saving mode utilizes gain from joint reception on the physical uplink shared channel (PUSCH) to facilitate a lower transmission power by the first UE, and wherein uplink CoMP according to the throughput-enhancement mode utilizes gain from joint reception to facilitate greater uplink throughput by the UE; and
    (c) providing uplink CoMP service to the first UE according to the selected mode; and
    when the first data-usage class is associated with the first UE or the first UE is not capable of uplink CoMP communication, or both, refraining from providing uplink CoMP service to the first UE.

15. A system comprising:
    a communication interface operable for cellular communications with user equipment (UE);
    at least one processor; and
    program instructions stored in a non-transitory computer readable medium and executable by at least one processor to:
    (a) determine, from a plurality of possible communication types, a communication type of a communication associated with a first UE, wherein the first UE is capable of uplink coordinated multipoint (CoMP) communication via an access network, and wherein a battery-saving mode and a throughput-enhancement mode are selectable for CoMP communication in the access network;

(b) based at least in part on the determined communication type, select either the battery-saving mode or the throughput-enhancement mode as an uplink CoMP enhancement mode for the first UE, wherein uplink CoMP according to the battery-saving mode utilizes gain from joint reception on the physical uplink shared channel (PUSCH) to facilitate a lower transmission power by the first UE, wherein uplink CoMP according to the throughput-enhancement mode utilizes gain from joint reception to facilitate greater uplink throughput by the UE, and wherein, when the determined communication type is a voice-over-LTE (VoLTE) call the battery-saving mode is selected for uplink CoMP transmissions by the first UE; and (c) provide uplink CoMP service to the first UE according to the selected mode.

16. The system of claim 15, wherein the system is implemented within or takes the form of an eNodeB in an LTE network, and wherein the eNodeB provides coverage in a serving cell that is part of an uplink CoMP cooperating set for the first UE.

17. The system of claim 15, further comprising program instructions executable to:

determine an application associated with the communication; and use the determined application as a further basis for selecting either the battery-saving mode or the throughput-enhancement mode as the uplink CoMP enhancement mode for the first UE.

18. The system of claim 15, further comprising program instructions executable to:

initially determine that the first UE is capable of uplink CoMP communication via the access network; and in response to determining that the first UE is capable of uplink CoMP perform (a) to (c).

19. The system of claim 15, further comprising program instructions executable to:

initially determine a data-usage class that is associated with the UE, wherein the data-usage class is one of a plurality of pre-defined data-usage classes comprising at least a first and a second data-usage class; and condition performance of (a) to (c) upon the first UE being associated with a data-usage class other than the first data-usage class.

* * * * *